United States Patent [19]
Gross

[11] Patent Number: 5,060,174
[45] Date of Patent: Oct. 22, 1991

[54] METHOD AND APPARATUS FOR EVALUATING A LOAD BEARING SURFACE SUCH AS A SEAT

[75] Inventor: Clifford M. Gross, Roslyn, N.Y.

[73] Assignee: Biomechanics Corporation of America, Deer Park, N.Y.

[21] Appl. No.: 510,653

[22] Filed: Apr. 18, 1990

[51] Int. Cl.$^5$ ................... G01N 9/00; G06F 15/00; A47C 27/00

[52] U.S. Cl. ................... 364/558; 297/283; 297/284 R; 364/413.02; 364/578

[58] Field of Search ................ 364/413.01, 413.02, 364/550, 554, 558, 578, 551.01; 297/283, 284

[56] References Cited

U.S. PATENT DOCUMENTS

| | | | |
|---|---|---|---|
| 3,982,786 | 9/1976 | Burgin et al. | 297/284 |
| 4,634,179 | 1/1987 | Hashimoto et al. | 297/284 |
| 4,728,150 | 3/1988 | Gaudreau, Jr. | 297/284 X |
| 4,753,482 | 6/1988 | Warren | 297/284 X |
| 4,858,992 | 8/1989 | La Sota | 297/284 |
| 4,890,235 | 12/1989 | Reger et al. | 364/579 X |

*Primary Examiner*—Parshotam S. Lall
*Assistant Examiner*—Ed Pipala

*Attorney, Agent, or Firm*—Pennie & Edmonds

[57] ABSTRACT

A method and apparatus are described for evaluating a load bearing surface such as a seat. Preferred apparatus for the practice of the invention comprises a plurality of sensors which are distributed across a load bearing surface such as a seat pan, apparatus for measuring the pressures exerted on the sensors when a weight is placed on the load bearing surface, and signal processing apparatus for evaluating the pressures that are measured. Advantageously, the signal processing apparatus can be utilized to store data which represents a comfort level for the load bearing surface and to evaluate the measured pressures in light of that data. For example, the data stored can be pressure measurements for a series of seats correlated with subjective appraisals of seat comfort and the evaluation can be performed by statistical analysis and comparison of the pressure measurements for a seat under test with the stored pressure measurements. Alternatively, the data stored can be a mathematical formula which relates pressure as measured at different areas of the seat pan to an index of comfort; and the evaluation can be performed simply by inserting the measured pressures into the formula and calculating the resulting index.

24 Claims, 9 Drawing Sheets

METHOD AND APPARATUS FOR EVALUATING A LOAD BEARING SURFACE SUCH AS A SEAT

BACKGROUND OF THE INVENTION

This relates to a method and apparatus for evaluating a load bearing surface. It is particularly useful in measuring the pressures exerted on a seat and in evaluating such seat for comfort. For this reason, it will be described in this context. However, it will be understood that the invention has other applications as well.

Despite the amount of time that people spend seated, very little quantitative information is available on what is a comfortable seat. Designers generally have to rely on their prior experience, customer feedback and the ultimate test of whether a specific design is successful or not. Needless to say, this is not very satisfactory in any situation and is especially bad where considerable time and large sums of money must be committed to a design without knowing whether a particular seat is comfortable or not. These problems are particularly acute in the transportation industry where seating comfort is a great concern to every consumer and where changes in a design are difficult if not impossible once production starts.

While attempts have been made in the past to quantify the issue of seating comfort, these attempts have not resulted in an acceptable means of measuring comfort. One difficulty with prior art systems is caused by interference between the measuring system and the individual testing the seat. In particular, the measuring system often causes the individual to alter the way he sits in the seat, thereby invalidating the whole measurement. Alternatively, the measuring system affects the individual's comfort, again rendering any measurements useless. Still other problems are created by the lack of real-time measurements which make it difficult to spot problems as they arise and make adjustments for these problems.

SUMMARY OF THE INVENTION

The present invention is directed to a method and apparatus for evaluating a load bearing surface such as a seat. Preferred apparatus for the practice of the invention comprises a plurality of sensors which are distributed across a load bearing surface such as a seat pan, means for measuring the pressures exerted on the sensors when a weight is placed on the load bearing surface, and signal processing means for evaluating the pressures that are measured. Advantageously, the signal processing means includes means for storing data which represents a comfort level for the load bearing surface and means for evaluating the measured pressures in the light of that data. For example, the data stored can be pressure measurements for a series of seats correlated with subjective appraisals of seat comfort and the evaluation can be performed by statistical analysis and comparison of the pressure measurements for a seat under test with the stored pressure measurements. Alternatively, the data stored can be a mathematical formula which relates pressures as measured at different areas of the seat pan to an index of comfort; and the evaluation can be performed simply by inserting the measured pressures into the formula and calculating the resulting index.

A preferred method of practicing the invention comprises the step of establishing a standard of seat comfort by:

making a measurement at a plurality of points distributed across a seat pan of pressures exerted by a human subject on said seat, dividing the measurements so made into a plurality of sets which group together measurements made in a same area of the seat pan, for each set, combining the measurements of said set to generate a value representative of the pressures exerted on that area, and correlating the combined measurements with a subjective estimate of seat comfort.

The comfort of a seat under test is then determined by:

making a measurement at a plurality of points distributed across a seat pan of a test seat of pressures exerted by a human subject on said seat, dividing the measurements so made into a plurality of sets which group together measurements made in a same area of the seat pan, for each set, combining the measurements of said set to generate a value representative of the pressures exerted on that area, and comparing the measurements relating to the test seat with the measurements of the standard to form an evaluation of the comfort of the test seat. As indicated above, the measurements can be compared in different ways, for example, by a statistical comparison of the test seat data with that of the standard or by calculation of a comfort index.

BRIEF DESCRIPTION OF DRAWING

These and other objects, features and advantages of the invention will be more readily apparent from the following detailed description of the invention in which.

DETAILED DESCRIPTION OF THE INVENTION

Figure 1:
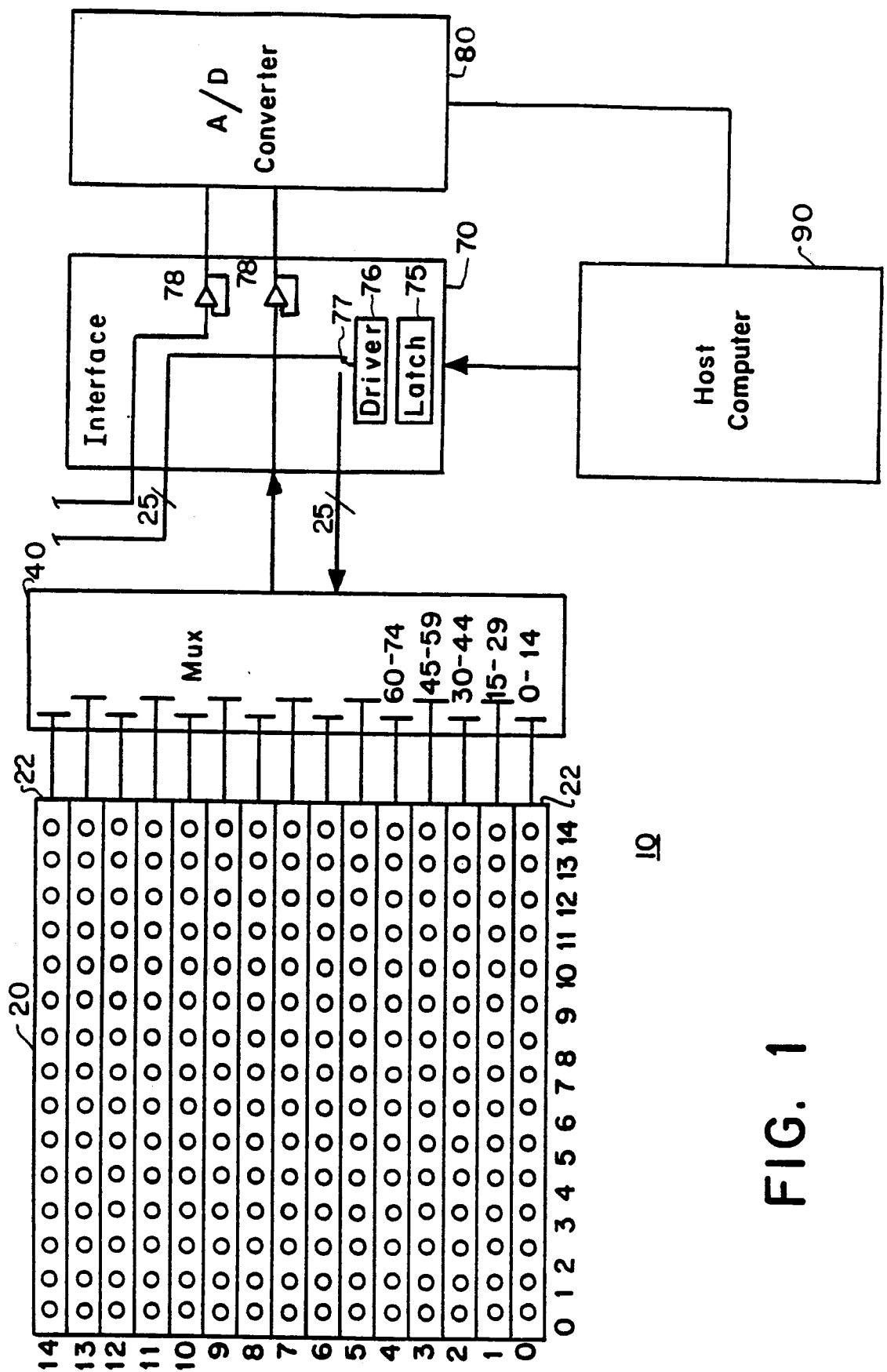
FIG. 1 is a block diagram of illustrative apparatus used in practicing a preferred embodiment of the invention.

FIG. 1 is a schematic diagram of a preferred apparatus 10 for the practice of the invention. This apparatus comprises a first array of sensors 20 and a first multiplexer 40, a second array of sensors and a second multiplexer (not shown) which are identical to the first array of sensors and multiplexers, an interface 70, an analog to digital converter 80 and a host computer 90 such as an IBM-PC (TM) computer or equivalent.

The sensors preferably are Force Sensing Resistor (TM) devices available from Interlink Electronics, Santa Barbara, Calif. These devices are polymer thick film devices which exhibit a decreasing resistance when an increasing force is applied in a direction normal to the device surface. The sensor is connected so as to form a voltage divider network with a bottom resistor having a resistance of about 8 to 10 kOhm.

Figure 2:
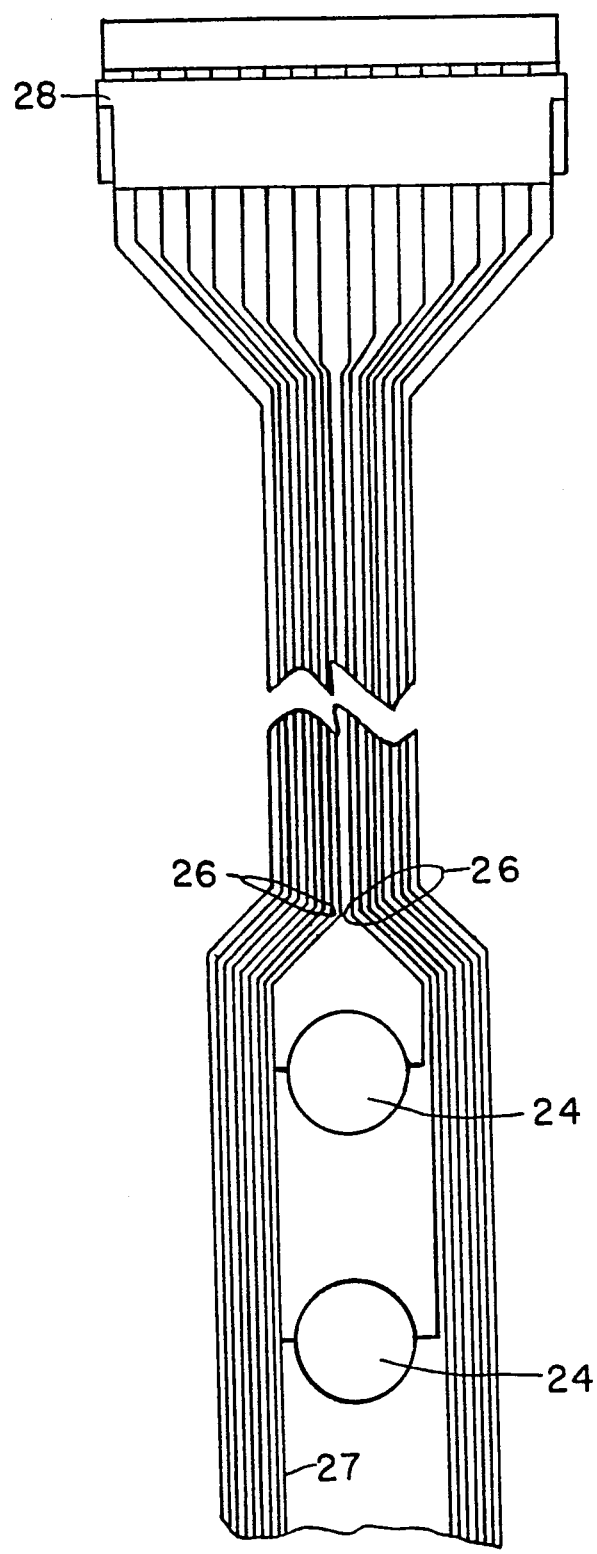
FIG. 2 is a plan view of a sensor strip used in the embodiment of FIG. 1.

Advantageously, these sensors are mounted in strips 22 of fifteen as suggested in FIG. 1. As shown in FIG. 2, in addition to fifteen sensors each strip 22 comprises a separate lead 26 for applying a voltage to each sensor, a common lead 27 connected to each sensor and a connector 28 which connects the sixteen leads to other circuitry. Illustratively, each sensor 24 is approximately one centimeter (cm) in diameter and the sensors are located on the strip so that their centers are about 2.5 centimeters apart. As shown schematically in FIG. 1, fifteen sensor strips 22 of fifteen sensors each are connected by connectors 28 to multiplexer 40 so that a total of 225 sensors are connected via multiplexer 40 to the channel 1 port of interface 70. The second array of sensors and second multiplexer are identical to the first and connect another 225 sensors to the channel 2 port of interface 70.

The sensor strips are mounted in a two-dimensional array to form a pressure pad which is placed on the upper surface of the load bearing surface to be tested. The load is then placed on the pressure pad. The pad is formed simply by taping together the individual sensor strips 22 using conventional flexible tape such as packing tape.

Figure 3:
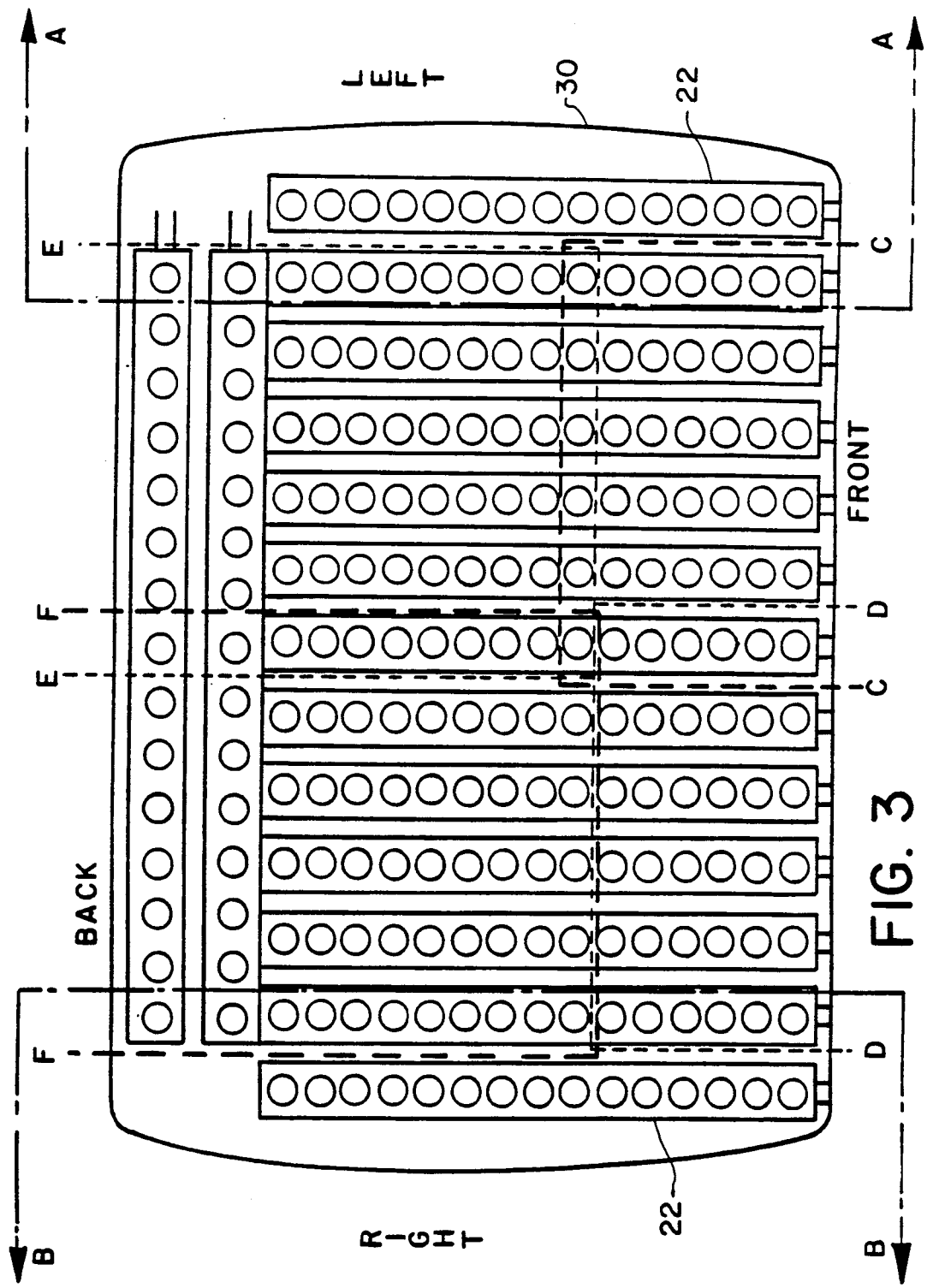
FIG. 3 is a plan view of a sensor array for a seat pan used in the embodiment of FIG. 1.
Figure 4:
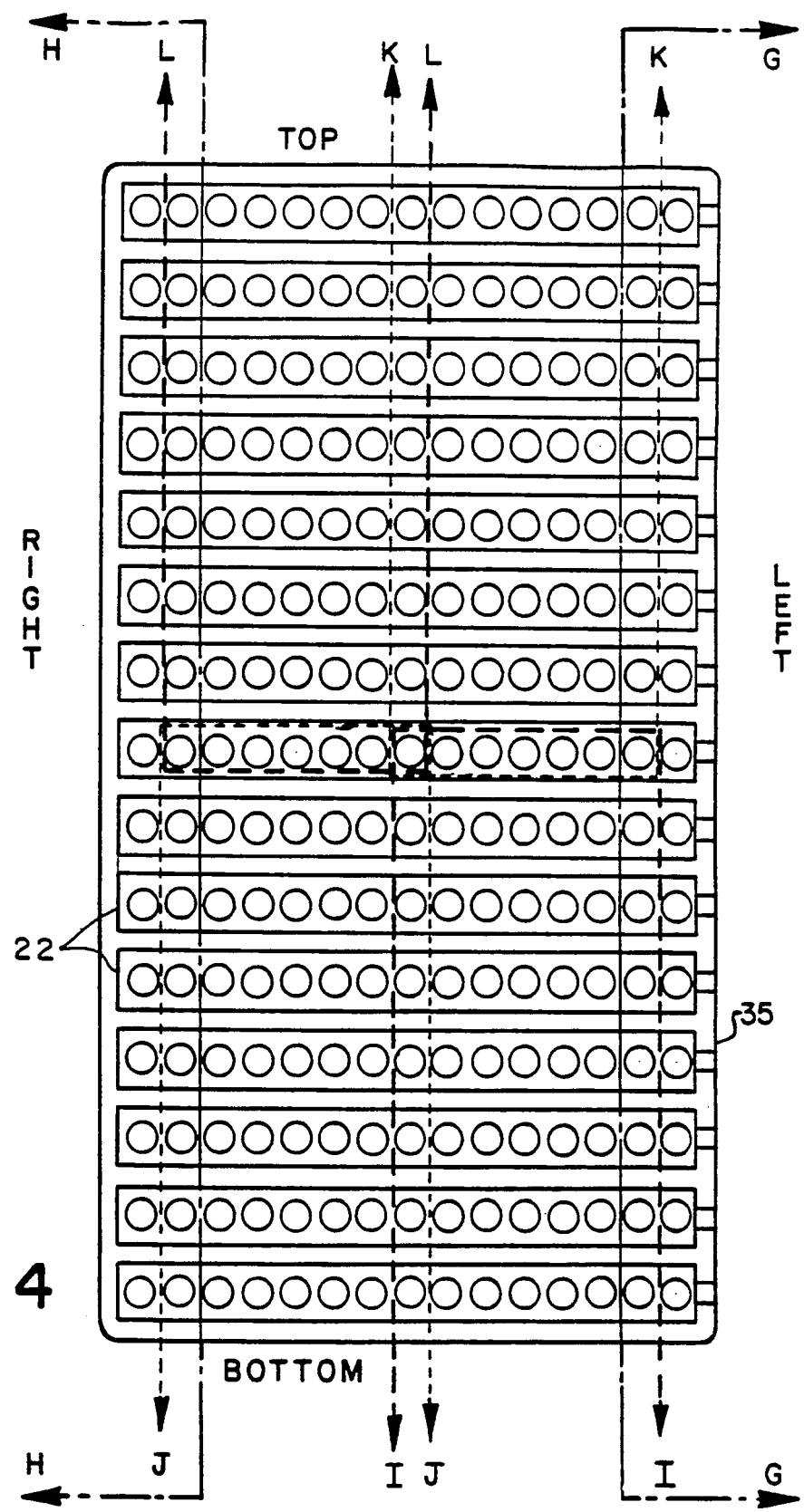
FIG. 4 is a plan view of a sensor array for a seat back used in the embodiment of FIG. 1.

An illustration of a pressure pad 30 used for measuring seat comfort is set forth in FIG. 3; and an illustration of a pressure pad 35 used for measuring comfort of the seat back is set forth in FIG. 4. As will be apparent, seat pan pressure pad 30 is thirteen strips wide with two additional strips extending crosswise at the back of the pad. As will also be apparent, the thirteen strips are spaced slightly apart so that the center-to-center spacing between sensors in adjacent strips is about 15/11 times the center-to-center spacing between adjacent sensors on a strip. Seat back pressure pad is fifteen strips wide.

For purposes of analyzing the data measured by the sensors it has been found convenient to group the sensors of each pressure pad into six sets. In FIG. 3, the sensors in each of these sets are the sensors bounded by the lines A—A, B—B, C—C, D—D, E—E and F—F which are identified as follows:

A—A: Left bolster.
B—B: Right bolster.
C—C: Left thigh.
D—D: Right thigh.
E—E: Left buttock.
F—F: Right buttock. In similar fashion, the sensors of the seat back pressure pad of FIG. 4 are grouped into six sets by the lines G—G, H—H, I—I, J—J, K—K, L—L which are identified as follows:
G—G: Left bolster.
H—H: Right bolster.
I—I: Left lumbar.
J—J: Right lumbar.
K—K: Left thoracic.
L—L: Right thoracic. As will be apparent, all identifications of these twelve sets are oriented with respect to an individual seated in these pads. It will also be evident that each of these sets has been defined so that the sensors at the edge of each set are included in at least one other set. Other definitions can be used if desired.

Multiplexer 40 is a 225-to-1 multiplexer which connects signals from any one of the 225 sensors to the channel 1 port via line 42 in response to control signals received from interface 70 via lines 44. Control signal lines 44 illustratively are provided in a twenty-five line cable which supplies power and ground to multiplexer 40 as well as at least eight bits of signal identifying a particular sensor of sensor array 20 whose output is to be read. These signals are processed by the circuitry of multiplexer 40 to select one of sensors 24 via a lead 26 of one sensor strip 24. The resistance of that sensor is converted to an analog output voltage and returned to interface 70 via output line 42.

Figure 5:
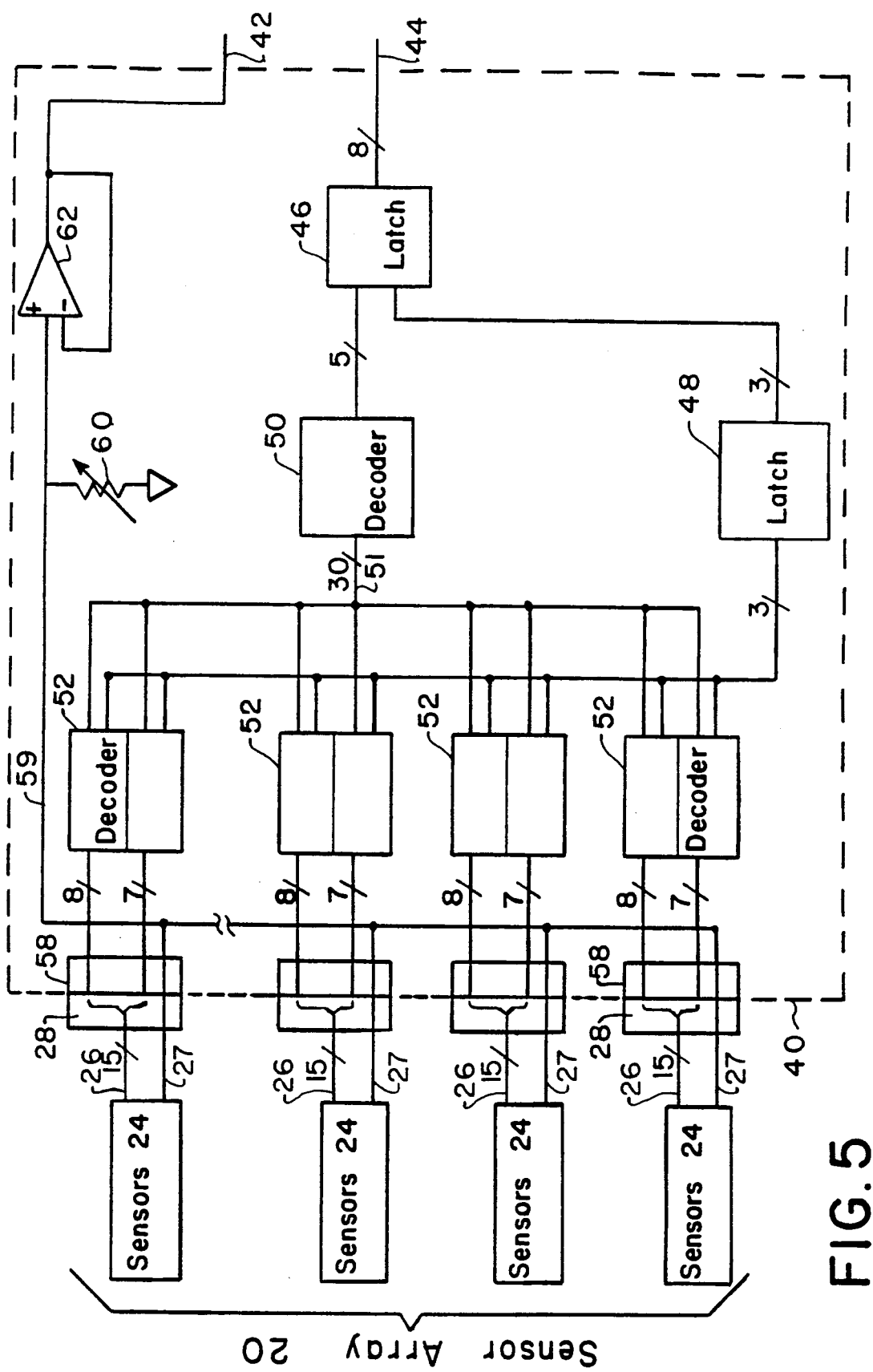
FIG. 5 is a schematic diagram of multiplexer used in the embodiment of FIG. 1.

As shown in FIG. 5, multiplexer 40 comprises an eight bit wide latch 46, a three bit wide latch 48, a 5-to-32 decoder 50, thirty 3-to-8 decoders 52 (of which eight are shown), a variable resistor 60 of 8 to 10 kOhms, a buffer amplifier 60, and fifteen connectors 58 (of which four are shown). Connectors 58 provide mating connections with the connectors 28 of FIG. 2 so as to connect the leads 26, 27 of each strip to the multiplexer.

The eight signal bits on line 44 are provided to latch 46. Three of the eight bits stored in latch 46 are provided to latch 48 which, in turn, provides them to each of the thirty decoders 52. The other five bits are provided to decoder 50 which decodes the five bits so as to identify one decoder 52 which is to be enabled while all the others are disabled. This decoder is enabled by an appropriate signal on one of the thirty output lines 51 from decoder 50. As a result, the enabled decoder 52 uses the three bits from latch 48 to identify that one of seven or eight output lines 53 from the decoder which is connected to the sensor which is to be read. Power is provided to this sensor through the appropriate lead 26 connected to the sensor. The sensor's resistance is read by common line 27 which is connected by connectors 28, 58 to output line 59. Line 59 is connected to variable resistor 60 which serves as the bottom resistor of a voltage divider network that converts the sensor's resistance to an analog voltage. This voltage signal is buffered by amplifier 62 and provided to interface 70 by line 42.

The second multiplexer is identical to the first and supplies analog voltage signals from a second sensor array to the channel 2 port of interface 70 via line 68 in response to control signals provided by lines 66.

Interface unit 70 provides connections between the analog lines 44 and 68 and output lines 72, 73 to A/D converter 80 as well as connections between host computer 90 and control lines 42, 66. It also provides ground and power to the multiplexers and suitable displays (not shown) indicating the particular sensor being read and the magnitude of its output voltage. As shown in FIG. 1, the host computer is connected to lines 42 and 66 via a latch 75, driver circuit 76 and a switch 77. The connections between lines 44 and 68 and lines 72, 73 are provided via buffer amplifiers 78.

A/D converter is a conventional analog-to-digital converter such as an A/D board manufactured by Data Translation Inc. of Marlboro, Mass. The board plugs into any eight bit slot in the host computer and provides its digital output directly to the host computer as indicated by line 82. The board has eight input channels, of which two are used in the embodiment shown in FIG. 1.

Figure 6:
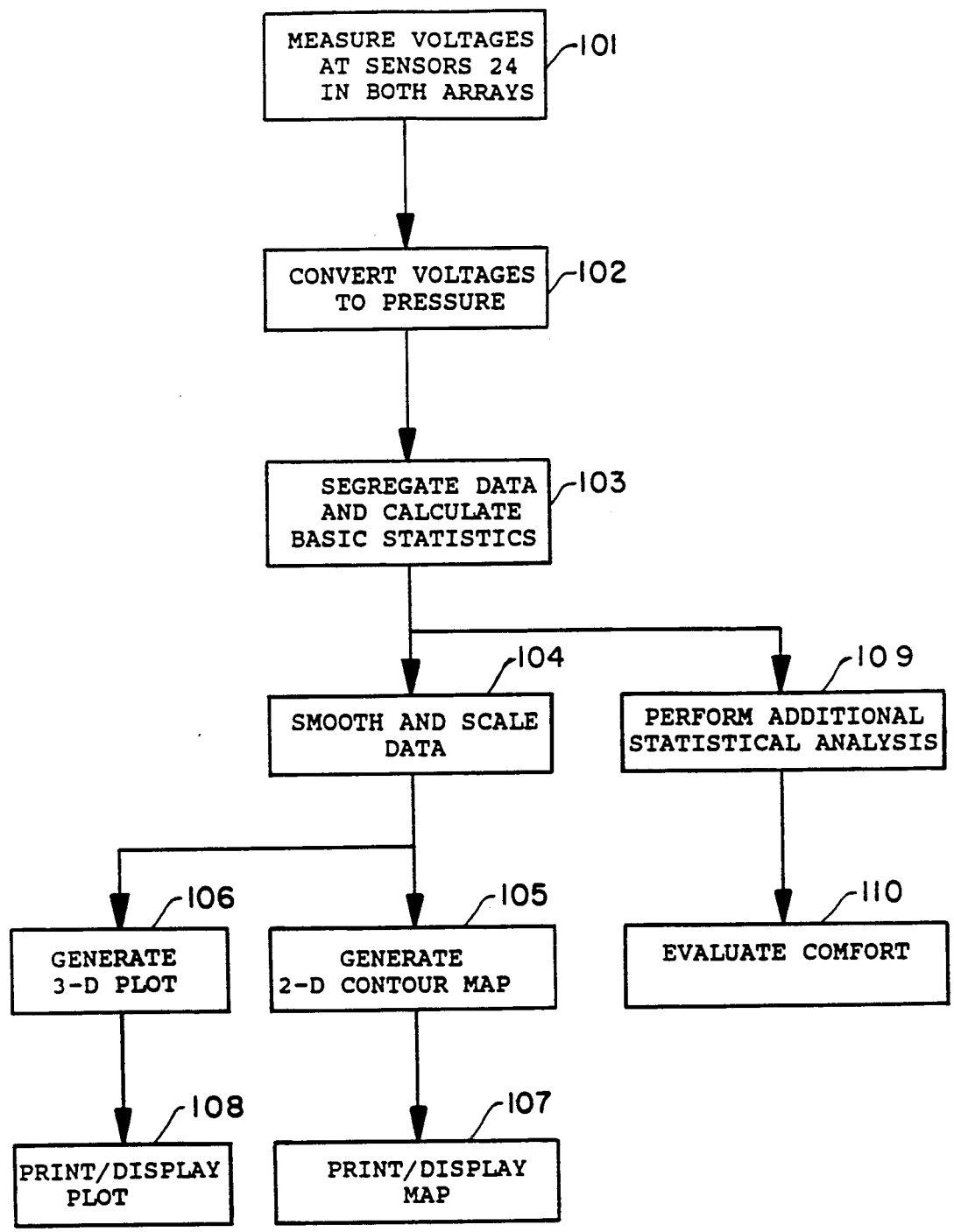
FIG. 6 is a general flow diagram depicting a pressure measurement made in accordance with the invention.

A general flow diagram depicting the operation of the system of FIG. 1 is set forth in FIG. 6. Host computer 90 systematically reads the analog voltage across each of the 225 sensors in the first array and the 225 sensors in the second array by applying a voltage to each of these sensors in turn through the first and second multiplexers. It has the sensor voltages converted to digital values by A/D converter 80 and stores these values in memory such as a disk memory in the computer (Box 101). In practice, it has been found useful to first measure the voltage across each sensor in the absence of any load and subtract that value from the voltage measured when the sensor is subjected to a load.

To process the data, the host computer converts the data to pressure values (Box 102), segregates the data into sets such as the six sets depicted in each of FIGS. 3 and 4, and analyzes this data to determine values such as the sum of the pressures exerted on the sensors in each set, the mean of the pressures, the median, and the standard deviation (Box 103). In addition the differences between the pressures exerted on adjacent sensors is also analyzed to determine pressure gradients and values such as the minimum, the maximum and the mean gradient are also determined. As is noted below, in some embodiments of the invention, not all of these values need to be determined for each set of sensors.

Figure 8:
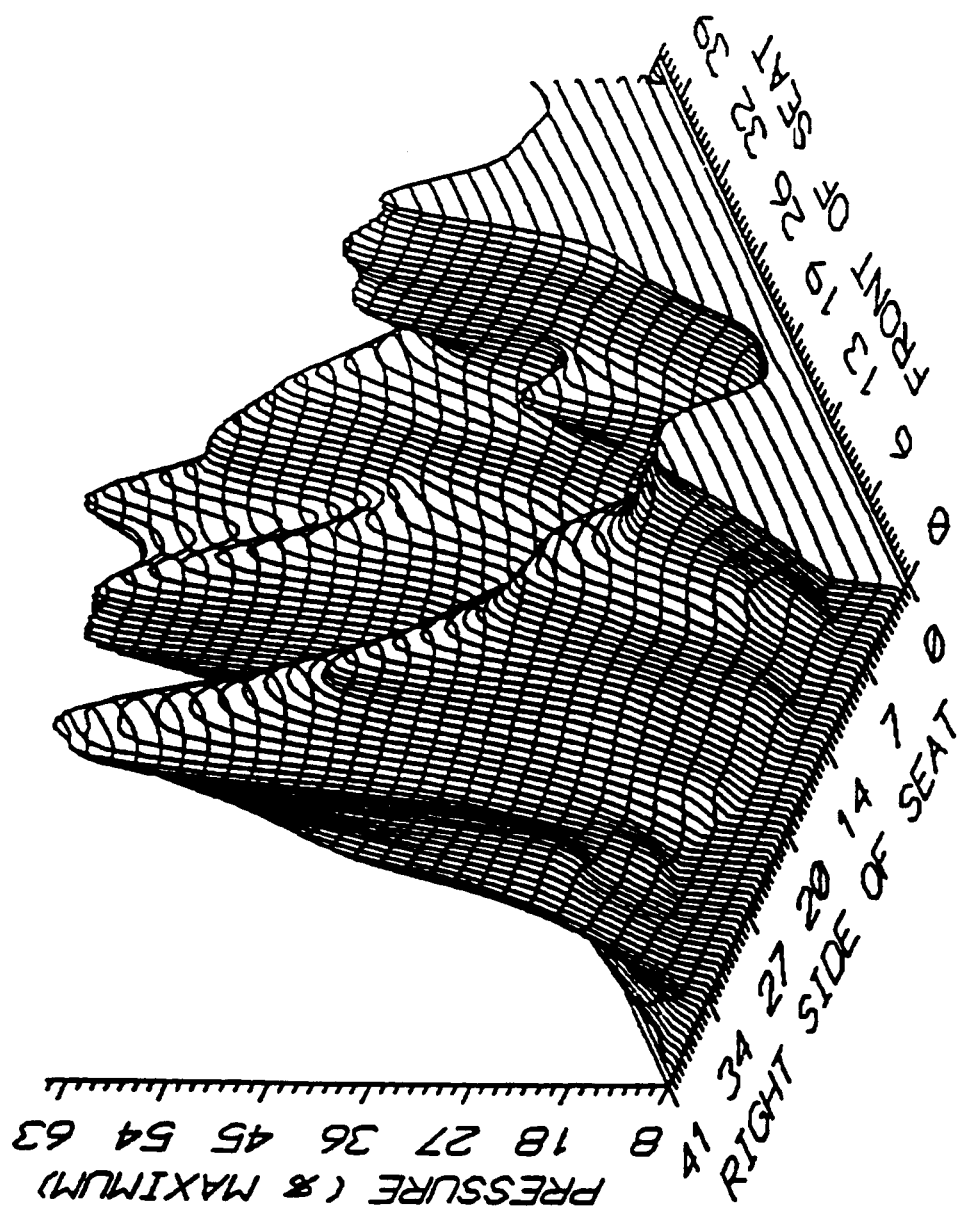
FIG. 8 is a two-dimensional contour map depicting pressure distribution over the surface area of a seat pan.
Figure 9:
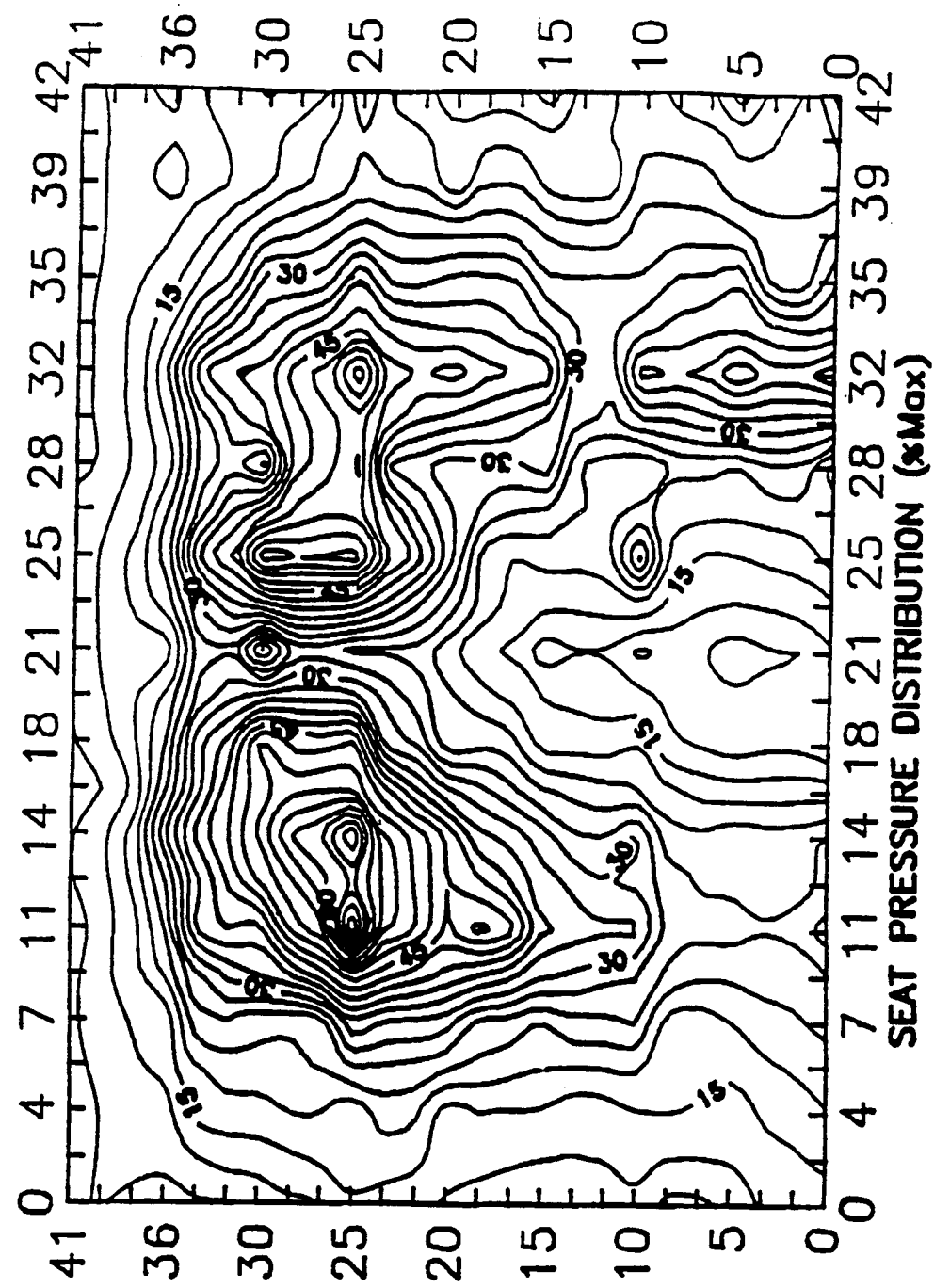
FIG. 9 is a three-dimensional plot of the same data as FIG. 8.

For display purposes, the data is then smoothed and scaled (Box 104) and from this data two-dimensional contour maps (Box 105) and/or three-dimensional plots are generated (Box 106). In either case these maps and plots are then printed and/or displayed (Boxes 107, 108). Suitable software programs for generating two- and three-dimensional displays are the GRID and TOPO programs of the Surfer (Reg. TM) software available from Golden Software, Inc. of Golden Colorado. Illustrative 2-D and 3-D displays of a rather uncomfortable seat pan are shown in FIGS. 8 and 9.

Alternatively, further statistical analysis can be performed on the data by performing regression analyses, correlations and the like (Box 109); and the data can be compared to data and evaluations of previously tested seats so as to predict comfort levels (Box 110). Such analysis techniques are applied to the data to identify and isolate those variables which significantly contribute to overall seat comfort. Using these variables in a multiple regression, a seat comfort prediction model has been developed. In addition, intercorrelations of physical seat dimensions, subject anthropometry, subjective comfort ratings and pressure measurement data are performed. The results of the statistical analysis are used to optimize seat design. Advantageously the statistical analysis can be performed using the SAS/STAT (TM) software from SAS Institute, Inc. of Cary, N.C.

Figure 7:
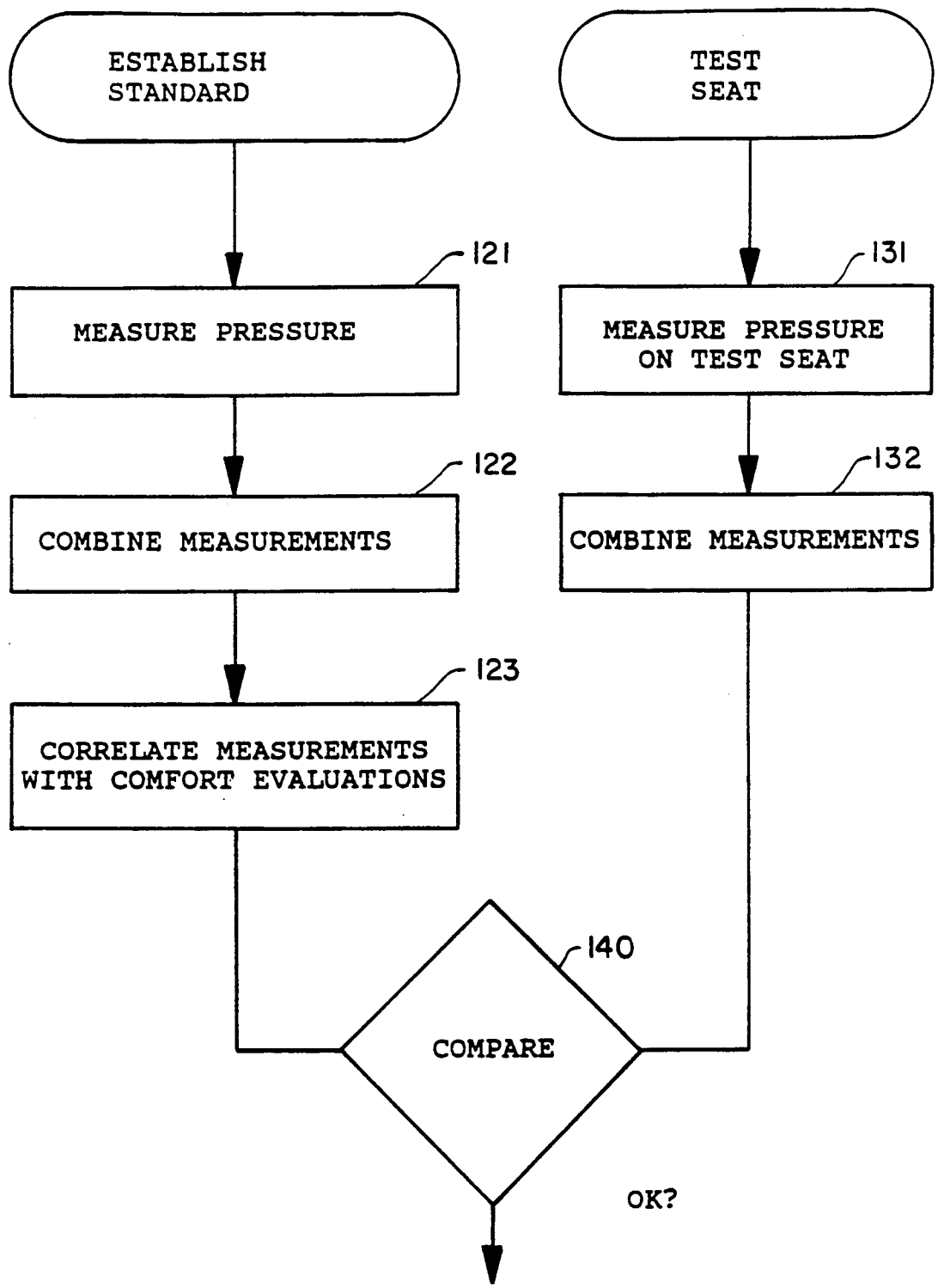
FIG. 7 is a flowchart useful in understanding the operation of the invention.

Further details of the comfort prediction process in the case of a seat are set forth in the flow chart of FIG. 7. As shown therein, seat comfort is determined by comparing a seat under test with a data base of prior measurements and evaluations (Box 140). The data base is generated by measuring the pressures exerted on the sensors of the seat back pressure pads of one or more seats (Box 121), combining the measurements that are made in each region to determine values such as the sum of the presures, the mean, the median, the standard deviation, the minimum gradient, the mean gradient and the maximum gradient (Box 122), and correlating the combined measurements with subjective evaluations of comfort (Box 123). The test seat is evaluated by measuring the pressure exerted on the test seat (Box 131) and combining these measurements in the same way the data base measurements were combined (Box 132). The combined test seat measurements are then compared with the combined data base measurements and the comfort of the test seat can be predicted on the basis of the similarity or dissimilarity of its pressure measurements with those of seats in the data base having known levels of comfort.

Different procedures may be used to compare the data base measurements with the test seat measurements. One procedure is simply to look for the seat in the data base which has a set of measurements closest to those for the seat being tested and adopt the evaluation for that seat in the data base as the evaluation of the seat under test. Alternatively, sophisticated statistical analysis can be used in this comparison.

All manner of variations may be practiced in determining what measurements are to be used in judging "closeness" and how much weight each measurements is to be given in the consideration. This, in turn, can lead to a formula which provides a raw number that serves as a comfort index and a seat can be evaluated simply by inputting the necessary measurements into the formula and comparing the resulting value with the known range of the index.

One comfort index that has been developed uses the following measurements and the corresponding multiplicative coefficients to evaluate seat back comfort:

| Measurement | Coefficient |
| --- | --- |
| a. Standard Deviation of pressures on the left bolster region | −0.01495 |
| b. Minimum Gradient of pressures on the thigh region | −0.006150 |
| c. Mean Gradient of pressures on left thigh region | 0.006187 |
| d. Maximum Gradient of pressures on right thigh region | 0.003646 |
| e. Mean Gradient of pressures on buttocks region | 0.002368 |
| f. Mean of pressures on left bolster region | −0.004915 |
| g. Median of pressures on left buttock region | 0.001246 |
| h. Sum of pressures on right buttock region | −0.000421 |
| i. Sum of pressures on right side | 0.000399 |

A comfort index for the seat back is specified by:

| Measurement | Coefficient |
| --- | --- |
| a. Sum of pressures on entire seat back region | −0.000595 |
| b. Mean of pressures on left bolster region | 0.025323 |
| c. Median of pressures on thoracic region | −0.009150 |
| d. Sum of pressures on right thoracic region | −0.000502 |
| e. Median of pressures on left lumbar region | −0.02491 |
| f. Mean of pressures on right side | 0.145755 |
| g. Median of pressures on right side | −0.026789 |
| h. Sum of pressures on left side | 0.000929 |

In each case the index is calculated by multiplying the coefficient and the corresponding measurement and then combining the products.

As will be apparent to those skilled in the art, numerous variations may be made within the spirit and scope of the invention. While the invention has been described in the context of measurements of seat loads and the determination of seat comfort, the invention may also be practiced in other environments.

What is claimed is:

1. A method of evaluating a seat for comfort comprising the steps of:

establishing a standard for seat comfort which relates a human subject's appraisal of seat comfort for a first seat to measurements of the pressure exerted by said human subject on a plurality of sensors distributed across a seat pan of said first seat when the subject is seated in said seat said standard being established by:

making a measurement at a plurality of points distributed across a seat pan of the first seat of pressures exerted by a human subject on said seat when the human subject is in the seat, dividing the measurements so made into a plurality of sets which group together measurements made in a same area of the seat pan, for each set, combining the measurements of said set to generate a value representative of the pressures exerted on that area, and correlating the combined measurements with a subjective estimate of seat comfort, making a measurement at a plurality of points distributed across a seat pan of a seat to be tested of pressures exerted by a human subject on said seat when the human subject is in the seat, dividing the measurements so made into a plurality of sets which group together measurements made in a same area of the seat pan, for each set, combining the measurements of said set to generate a value representative of the pressures exerted on that area, and comparing the combined measurements relating to the seat being tested with the combined measurements of the standard to form an evaluation of the comfort of the seat being tested.

2. The method of claim 1 wherein the measurements are divided into six sets.

3. The method of claim 1 wherein the measurements are divided into six sets including a left bolster region, a left thigh region, a left buttock region, a right bolster region, a right thigh region, and a right buttock region.

4. The method of claim 1 further comprising the steps of determining the sum of the measurements made in at least one set of measurements and the standard deviation of the measurements made in at least one set of measurements.

5. The method of claim 1 further comprising the steps of determining for at least one set of measurements the difference in measurements between adjacent sensors and identifying at least one of the maximum difference and the minimum difference.

6. The method of claim 1 further comprising the steps of:

establishing a standard for seat back comfort which relates a human subject's appraisal of seat back comfort for a first seat to measurements of the pressure exerted by said human subject on a plurality of sensors distributed across a seat back of said first seat when the subject is seated in said seat said standard being established by:

making a measurement at a plurality of points distributed across a seat back of the first seat of pressures exerted by a human subject on said seat back when the human subject is in the seat, dividing the measurements so made into a plurality of sets which group together measurements made in a same area of the seat back, for each set, combining the measurements of said set to generate a value representative of the pressures exerted on that area, and correlating the combined measurements with a subjective estimate of seat back comfort, making a measurement at a plurality of points distributed across a seat back of a seat to be tested of pressures exerted by a human subject on said seat back when the human subject is in the seat, dividing the measurements so made into a plurality of sets which group together measurements made in a same area of the seat back, for each set, combining the measurements of said set to generate a value representative of the pressures exerted on that area, and comparing the combined measurements relating to the seat back being tested with the combined measurements of the standard to form an evaluation of the comfort of the seat back being tested.

7. The method of claim 6 wherein the measurements on the seat back are divided into six sets.

8. The method of claim 6 wherein the measurements on the seat back are divided into six sets including a left bolster region, a left lumbar region, a left thoracic region, a right bolster region, a right lumbar region, and a right thoracic region.

9. The method of claim 6 further comprising the steps of determining the sum of the measurements made in at least one set of measurements and the standard deviation of the measurements made in at least one set of measurements.

10. The method of claim 6 further comprising the steps of determining for at least one set of measurements the difference in measurements between adjacent sensors and identifying at least one of the maximum difference and the minimum difference.

11. A method of evaluating a seat for comfort comprising the steps of:

establishing an index of seat comfort which relates a human subject's appraisal of seat comfort to measurements of the pressure exerted by said human subject on a plurality of sensors distributed across a seat pan of a seat;

testing a seat by making a measurement at a plurality of points distributed across a seat pan of pressures exerted by a human subject on said seat when the human subject is in the seat, dividing the measurements so made into a plurality of sets which group together measurements made in a same area of the seat pan, for each set combining the measurements of said set to generate a value representative of the pressures exerted on that area, and comparing the combined measurements with the index of seat comfort.

12. The method of claim 11 wherein the measurements are divided into six sets.

13. The method of claim 11 wherein the measurements are divided into six sets including a left bolster region, a left thigh region, a left buttock region, a right bolster region, a right thigh region, and a right buttock region.

14. The method of claim 11 further comprising the steps of determining the sum of the measurements made in at least one set of measurements and the standard deviation of the measurements made in at least one set of measurements.

15. The method of claim 11 further comprising the steps of determining for at least one set of measurements the difference in measurements between adjacent sensors and identifying at least one of the maximum difference and the minimum difference.

16. The method of claim 11 further comprising the steps of:
    testing a seat by making a measurement at a plurality of points distributed across a seat back of pressures exerted by a human subject on said seat back when the human subject is in the seat,
    dividing the measurements so made into a plurality of sets which group together measurements made in a same area of the seat back,
    for each set, combining the measurements of said set to generate a value representative of the pressures exerted on that area, and
    comparing the combined measurements with the index of seat comfort.

17. The method of claim 16 wherein the measurements are divided into six sets.

18. The method of claim 16 wherein the measurements are divided into six sets including a left bolster region, a left lumbar region, a left thoracic region, a right bolster region, a right lumbar region, and a right thoracic region.

19. The method of claim 16 further comprising the steps of determining the sum of the measurements made in at least one set of measurements and the standard deviation of the measurements made in at least one set of measurements.

20. The method of claim 16 further comprising the steps of determining for at least one set of measurements the difference in measurements between adjacent sensors and identifying at least one of the maximum difference and the minimum difference.

21. Apparatus for evaluating a seat for comfort comprising:
    a two-dimensional array of sensors distributed across an area approximately as large as that of a seat pan of a first seat that is to be evaluated,
    means for reading signals from said sensors that are representative of pressures exerted by a human subject when said subject is seated in said first seat,
    means for processing said signals to form data values representative of said seat,
    means for storing said data values for a second seat having a specified comfort level, and
    means for comparing the data values derived from the first seat with the data values derived from the second seat to determine a comfort level for the first seat.

22. The apparatus of claim 21 further comprising a second two-dimensional array of sensors distributed across an area approximately as large as that of a seat back of a seat that is to be evaluated and means for reading signals from said sensors that are represenative of pressures exerted by a human subject when said subject is seated in said seat.

23. The apparatus of claim 21 wherein the reading means comprises means for selectively applying a voltage to each sensor and for determining the voltage drop across said sensor.

24. The apparatus of claim 21 wherein each sensor is a force sensing resistor whose resistance decreases with increasing pressure.

* * * * *